Feb. 24, 1942.  M. A. STICELBER  2,274,220
REFRIGERATED DOUGH MIXER
Filed Nov. 8, 1940  2 Sheets-Sheet 1
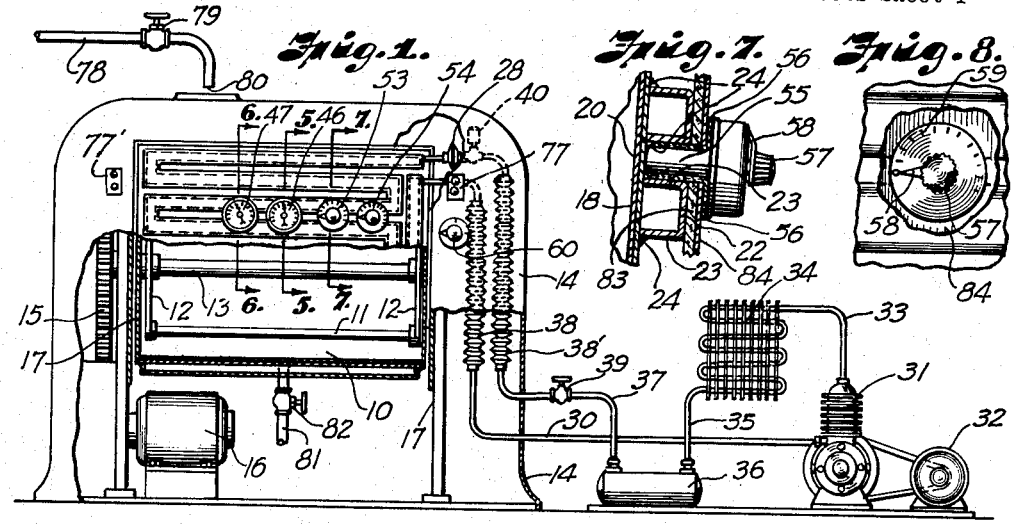
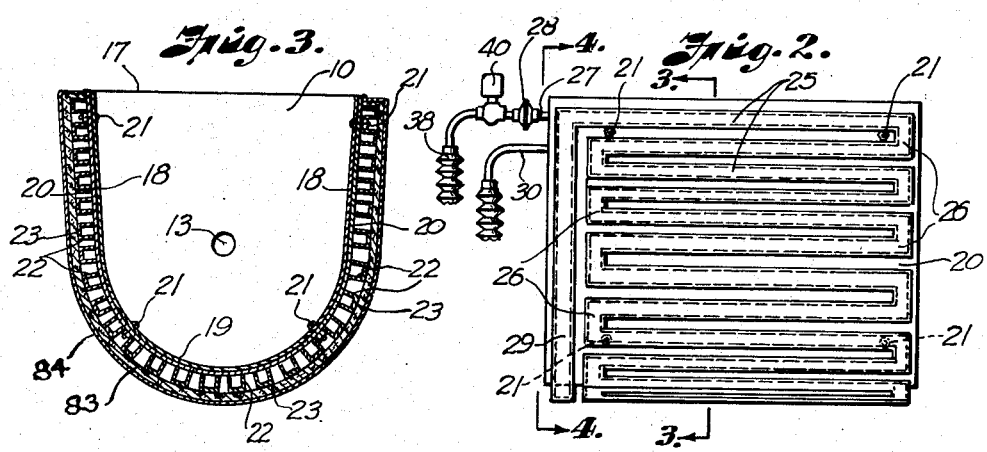
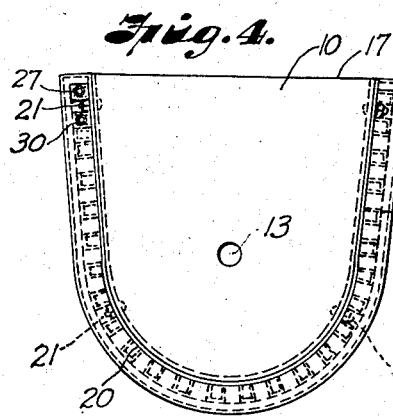
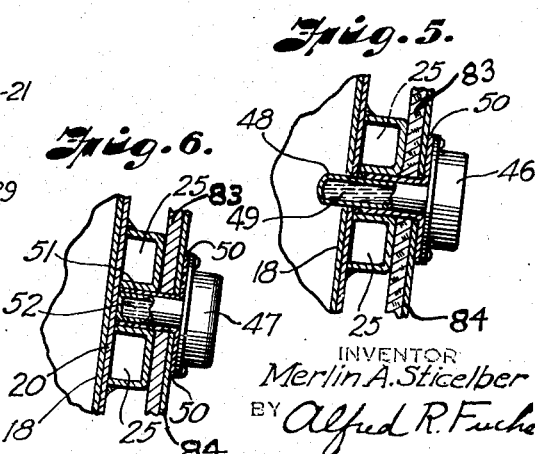
INVENTOR
Merlin A. Sticelber
BY Alfred R. Fuchs
ATTORNEY

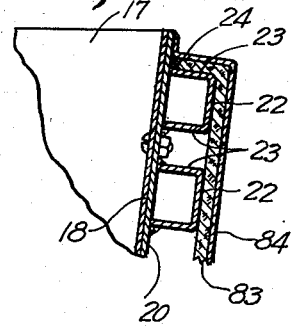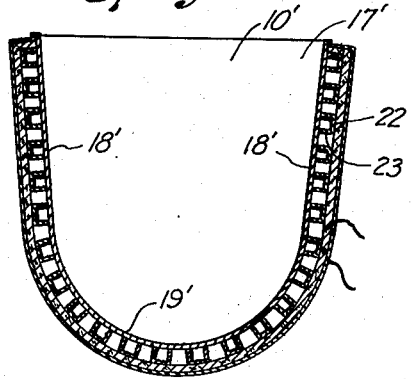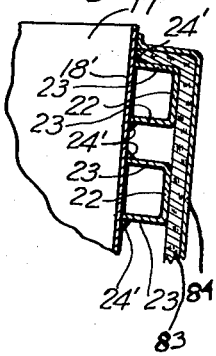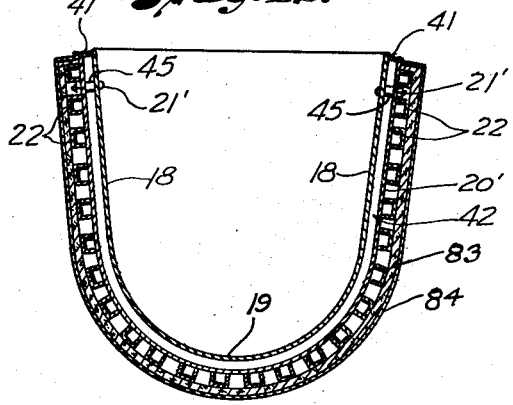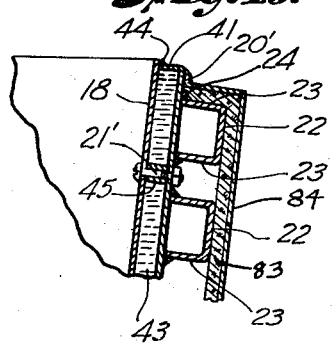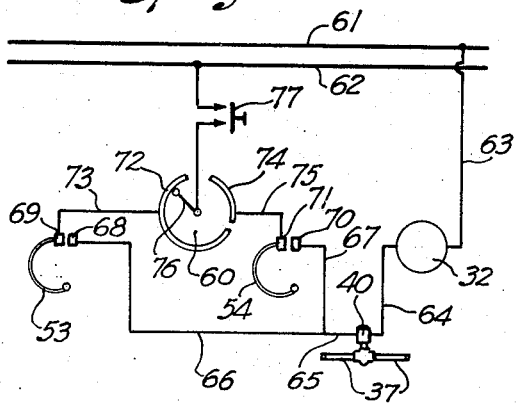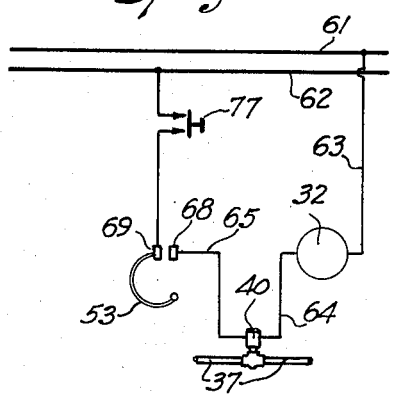

Patented Feb. 24, 1942

2,274,220

UNITED STATES PATENT OFFICE 2,274,220

REFRIGERATED DOUGH MIXER

Merlin A. Sticelber, Kansas City, Mo.

Application November 8, 1940, Serial No. 364,903

19 Claims. (Cl. 62—1)

My invention relates to refrigerated mixers, and more particularly to a refrigerated dough mixer, that is provided with means for obtaining a desired temperature, or temperature conditions, within the same. In the art of mixing dough it is desirable to carry on the mixing action to a stage such that the highest gluten development from the flour in the dough can be obtained. This is accomplished by the mixing, or kneading, action of the agitator members, or beater arms, in the dough mixer, and is dependent upon the length of time that the mixing operation takes place, as well as the rate at which the same takes place. Due to the heat generated in the agitation process, or mixing process, caused by the mechanical movement of the mass within the mixer, as well as the heat developed by the action of the yeast on the dough, there is a gradual rise in temperature of the contents of the dough mixer from the beginning of the mixing operation, which rise in temperature is accelerated as the operation proceeds. Inasmuch as it is harmful to the quality of the dough to have the temperature thereof rise above a certain point in the mixer, it is necessary to shorten the mixing operation below that most desirable for full gluten development, to prevent too high temperature developing in the dough in the mixer. Also in the art of mixing other materials heat is often generated, and frequently the generation of heat in such mixing operation produces either an undesirable and even a dangerous effect on the contents of the mixing machine. It is a purpose of my invention to provide a method and means for carrying out the mixing of a dough, or the mixing of other materials, the agitation and mixing of which causes a rise in the temperature of the contents of the mixer, whereby the mixing operation can be carried out to the full extent desired, without any harm being done to the contents of the mixer, and the best results obtained by the mixing operation, such as obtaining the greatest development of gluten in a dough mixture, without having the temperature rising to a point that is too high for the dough, the invention disclosed herein being an improvement over the invention disclosed in my application Serial No. 339,639, filed June 10, 1940, on Dough mixer.

While it has been common practice to start a dough with cold water, the water being as near to the freezing point as practicable when the mixing of the dough is started, and while ice has been put in dough previously to prevent the undesirable rise in temperature thereof, this use of ice provides uneven temperature conditions in the contents of the mixer, and the use of cold water in the dough does not accomplish the purpose, as the rise in temperature is not checked sufficiently thereby to prevent an undesirable rise in temperature before the necessary mixing to obtain full gluten development is reached. Furthermore, as the melting of the ice increases the water content of the dough, this has to be compensated for. Also the use of ice causes considerable inconvenience and requires considerable calculation to get the proper moisture content of the dough.

I have found that, particularly, in the art of mixing dough, it depends considerably upon what kind of a dough is being mixed as to what temperature conditions are preferable. It is highly desirable to have the dough leave the mixer at a temperature that is not over 80 degrees in the case of any dough. It has been found, in the case of one rye bread dough mixture, for example, that it is desirable to start the mixing operation with the mixer wall at a temperature as near to the freezing point as possible, but slightly above, substantially 33 degrees being preferable, and to continue the operation after a certain number of minutes of operating at this temperature, with the walls of the mixer at a temperature of 40 degrees. By giving the full length of mixing of the dough that is required for full gluten development of the same, it is found that by this method the dough can be discharged from the mixer at a temperature of 76 degrees, well within the maximum temperature limit permissible and producing a much better dough and better bread than has been previously possible without proper control of the temperature in the mixer.

It has been found also that in some cases it may be desirable to operate the dough mixer with the wall thereof at a constant temperature, and in other cases where the same kind of a dough is repeatedly mixed in the same mixer, it is highly desirable to provide for a change from one temperature to another at a definite timed interval after placing the ingredients of the dough in the mixer. It is accordingly a purpose of my invention to provide temperature responsive means for controlling the temperature of a dough mixer wall such that the same can be adjusted manually whenever desired, to the temperature that is found to be the most expedient for the particular dough that is being mixed. It is also a purpose of my invention to provide means for controlling the temperature, that may be manually adjustable, but which comprises a means that is operative at the temperature for which it is set for a certain period of time, after which time controlled means sets other temperature responsive controlling means, which may also be manually adjusted, into operation to provide a different temperature for the wall of the mixer suitable for the particular dough that is being mixed.

Obviously other mixing apparatus in which one or more temperature conditions are desirable, can be similarly provided with such controlling means, and it is a purpose of my invention to provide such controlling means for mixing apparatus, in which the contents of the mixer have to be maintained at temperatures that are controlled closely within certain limits, either for safety purposes or to obtain a better product.

It is a further purpose of my invention to provide in a mixer, particularly a dough mixer, indicating means for indicating the temperature of the contents of the mixer and for simultaneously indicating the temperature of the mixer wall, so that a definite and accurate check of the dough temperature will be available and so that by experiment the proper wall temperature for any particular dough can be determined, and can then be maintained by proper adjustment of the controlling means, whenever that particular kind of a dough is being mixed.

It is an important purpose of my invention to provide means for converting dough mixers, that are already constructed and in use, so as to embody my invention, comprising a sheet of flexible metal that can be secured in heat conducting relation to a dough mixer wall over a large area thereof and conformed to the shape of said wall, which carries the conduit means for conducting the refrigerant in a circuitous path in heat conducting relationship to said wall. Preferably, the apparatus comprises direct refrigeration means for the wall of the mixer and the refrigerating coil is an expansion coil, arranged in heat conducting relation to the walls of the mixer that the dough contacts, mounted on such a flexible sheet as above referred to. Preferably, channel members are secured to either such a sheet, in the case of remodeling a dough mixer to embody my invention, or directly to the dough mixer wall, in the case of a newly built dough mixer, said channel members being placed with the flanges thereof in fluid-tight relation to the sheet or the mixer wall, and the web portion thereof spaced from said sheet, to form conduits rectangular in cross section extending in a continuous circuitous path back and forth along the dough mixer wall, or walls, that are to be refrigerated.

It is an important purpose of my invention to provide a method of maintaining, between predetermined temperature limits, the contents of a mixing chamber, said contents having a tendency to rise in temperature during the mixing operation, said method comprising the maintaining of the major portion of the walls of the chamber at a temperature such that frost will not form on the inner face of the mixer walls, and such that the temperature of the contents of the mixer will not fall below a predetermined minimum, and not rise above a predetermined maximum.

Other objects and advantages of my invention will appear as the description of the drawings proceeds. I desire to have it understood, however, that I do not intend to limit myself to the particular details shown or described, except as defined in the claims.

In the drawings:

Fig. 1 is a diagrammatic view partly in section, of a dough mixer and the cooling means therefor comprising my invention.

Fig. 2 is an elevational view of the mixer bowl only, as viewed from the opposite side from Fig. 1, showing my improved cooling means applied thereto.

Fig. 3 is a section taken on the line 3—3 of Fig. 2.

Fig. 4 is a section taken on the line 4—4 of Fig. 2.

Fig. 5 is an enlarged fragmentary sectional view taken on the line 5—5 of Fig. 1.

Fig. 6 is a similar view taken on the line 6—6 of Fig. 1.

Fig. 7 is a similar view taken on the line 7—7 of Fig. 1.

Fig. 8 is a fragmentary elevational view of one of the manually adjustable thermostatic controlling elements as viewed from the right of Fig. 7.

Fig. 9 is a fragmentary sectional view on an enlarged scale through the dough mixer body shown in Figs. 1 to 4, inclusive.

Fig. 10 is a vertical section through a dough mixer body showing a modification of my invention.

Fig. 11 is an enlarged fragmentary sectional view of the modification shown in Fig. 10.

Fig. 12 is a view similar to Fig. 10, of a further modification.

Fig. 13 is a fragmentary sectional view on an enlarged scale of the form of the invention shown in Fig. 12.

Fig. 14 is a circuit diagram of one form of controlling means utilized in conjunction with my invention, and Fig. 15 is a similar view of another form of controlling means utilized in conjunction with my invention.

Referring in detail to the drawings, in Fig. 1 is shown a dough mixer having a body portion, or bowl, 10 and beater arms, or agitator members, 11 operating in the chamber formed within the body portion, or bowl, and which are mounted in any suitable manner, such as on the spiders 12, for rotation about an axis, said spiders being fixed on the shaft 13 to rotate therewith. The shaft 13 is mounted on suitable bearing members and is rotated by means of suitable gearing enclosed in a housing 14, driving a large gear wheel 15, that is fixed to the shaft 13, by means of a motor 16 through said gearing in an obvious manner. A suitable refrigerating element is arranged in heat conducting relation with the wall of the body portion 10 of the mixer. The body portion of the mixer is provided with a pair of end walls 17, through which the shaft 13 extends and on which said body portion is tiltable by means of suitable mechanism, which is not shown, as it operates in a well known manner.

Extending between the end walls 17 is a wall that comprises the slightly diverging wall portions 18 that merge into a curved portion 19, thus forming the bowl of the mixer of customary shape. The curvature of the portion 19 is about the axis of the shaft 13 as a center so that the beater arms move in close proximity to this wall portion and throw the dough in the mixer about and into engagement with the wall portions 18 and 19 repeatedly, as the beater arms, or agitator members, rotate. The walls 18 can be thus referred to as the inclined front and back walls of the mixer body, or bowl, and the curved wall portion 19 as the curved bottom wall of the body portion, or bowl.

The refrigerating element shown in the various forms of the invention illustrated herein, in all cases, comprises a continuous circuitous conduit secured to the wall of the mixer made up of the portions 18 and 19, and comprises a plurality of spaced refrigerant passages connected in series. While various ways of providing these passages forming the continuous circuitous conduit for the refrigerant in heat conducting relation to said walls of the mixer may be provided in the manufacture of dough mixer bowls, or body portions, having such refrigerating means built into the same at the time of manufacture, in Figs. 1 to 9, inclusive, a form of my invention is illustrated that is particularly desirable for use where a dough mixer already in use is to be converted into a refrigerated mixer of the type embodied in my invention. In order to make it unnecessary to dismantle a mixer and to make it possible to more rapidly convert a mixer already in use, that is provided with no such refrigerating means as constitutes my invention, to one that does include such refrigerating means, I have provided a refrigerating element that comprises a flexible sheet metal member 20 that is, preferably, mounted in face to face relation with the wall portions 18 and 19, by securing the same thereto by any suitable securing means, such as the bolts and nuts 21. Any other fastening elements that may be found desirable to use for this purpose can be used, or the flexible sheet metal member 20 can be welded to the wall portions 18 and 19, if this is found to be feasible.

Channel members that have the web portions 22 and the legs 23 are provided for forming the circuitous conduit for the refrigerant, in conjunction with the sheet metal member 20. Said channel members are secured to the flexible sheet metal member 20 in liquid-tight relation, by welding, brazing, or in any other suitable manner securing the same along the edges of the legs of the channels, as indicated at 24, to said sheet metal body portion 20. The channels and the sheet metal member 20 may be made of any suitable metal, although the sheet metal member 20 is, preferably, made of copper, brass, or similar material, that is a very good heat conductor. The channels are, of course, cut to suitable size and shape and the sections thereof secured together in liquid-tight relation to each other, by welding, brazing, or in a similar manner, to provide a refrigerating coil, or element, that is made up of a plurality of parallel passages formed by lengths 25 of said channels running parallel to the axis of the mixer body, or bowl, and channel connecting portions 26 that connect the adjacent parallel lengths of conduit 25 alternately adjacent the opposite end walls 17, so as to provide a continuous, sinuous, circuitous path for the refrigerant along the wall of the dough mixer in heat transfer relation thereto from adjacent the top edge of one wall portion 18 to adjacent the top edge of the other wall portion 18. The uppermost transverse conduit portion 25 on the one wall 18 of the mixer is provided with a connection 27 leading from the expansion valve 28, and the uppermost transverse conduit portion 25 on the other wall 18 of the mixer has a conduit 29 extending therefrom circumferentially around the mixer back to adjacent the first mentioned conduit portion 25, as will be clear from Figs. 1 and 2 of the drawings, and has the suction pipe 30 connected therewith.

Any suitable refrigerating system can be utilized for circulating the refrigerant and causing the same to go through the expansion and condensation cycles required, as long as a direct expansion system is utilized for cooling the wall of the dough mixer. A conventional system is shown for purposes of illustration, comprising a compressor, or pump, 31, driven by a motor 32, from which the conduit 33 extends to a condenser 34, and from said condenser a conduit 35 extends to a receiver 36 and from said receiver the conduit 37 extends to the expansion valve 28, a flexible, expansible and contractible conduit portion 38 of the metallic bellows type being provided to allow for the movements of the mixer both to the alternative positions that it assumes, that is, the upright and the mixing positions, and the dumping position, as is well established practice.

A manually operated valve 39 is provided in the conduit 37 to control flow of refrigerant from the receiver 36, through the conduit 37 and through the expansion valve 38 into the refrigerating coil, or refrigerating element, made up of the conduit portions 25, 26 and 29, above referred to. The purpose of this valve will be explained below. An electro-magnetic valve 40 is also, preferably, interposed between the receiver 36 and the expansion valve 28, which operates to cut off flow of refrigerant through the expansion valve when the circuit to the motor 32 is broken by a thermostatic controlling means, as will be described below. The gas return conduit or suction pipe 30 is provided with a flexible expansible and contractible conduit portion 38', preferably of the metallic bellows type.

While, preferably, the sheet metal member 20 is secured in close face to face relationship with the dough mixer wall portions 18 and 19, it may be found desirable to provide heat conducting means of a low melting point, such as solder, or a heat conducting liquid, such as an oil, between said sheet metal wall and the dough mixer body wall portions 18 and 19 to provide for a heat transfer relationship between the dough mixer wall and the wall of the refrigerating element throughout. Such an arrangement is shown in Figs. 12 and 13, in which the sheet metal member 20' is flanged at its edges, as shown at 41, to provide a liquid chamber 42 between the member 20' and the walls 18 and 19 of the mixer body, or bowl, which may be filled with a heat conducting liquid 43, such as oil, for example, the flanges 41 being welded as at 44, to the walls of the mixer body, so as to provide a liquid-tight sealed chamber in which the liquid 43 is enclosed.

Any suitable fastening means can be used for securing the member 20' in position, such as the bolts 21', which may be provided with spacing sleeves 45 to space the member 20' properly from the wall portions 18 and 19. The channel members are secured to the sheet metal member 20' in the same manner as previously described, and are made in the same manner as was previously described and bear the same reference numerals, the same being also, preferably, arranged on the mixer body in a similar manner to that previously described. The spacing of the sheet metal member 20' from the walls 18 and 19 is somewhat exaggerated in the drawings, it being unnecessary to have any large space for the liquid 43, the liquid 43 being merely provided to have contact means throughout the opposed area of the walls 18 and 19 and the sheet metal member 20'.

In manufacturing a mixer body embodying my invention the sheet metal members can be done away with and a body member 10', such as shown in Figs. 10 and 11, can be provided, having the end walls 17' and the wall portions 18' and 19', to which the channel members are welded directly, as illustrated in Figs. 10 and 11, the channel members being the same as previously described, having the web portions 22 and the legs 23, which are welded at their edges to the adjacent mixer wall portions 18' and 19', as shown at 24', the arrangement of the conduit portions to obtain the circuitous, sinuous passage for the refrigerant being, preferably, the same as illustrated in connection with the form of the invention shown in Figs. 1 to 9, inclusive.

In all the forms of the invention, suitable controlling and indicating means are provided for controlling and indicating the temperature of the dough mixer walls and the dough in the mixer, no matter what means for mounting the refrigerating element on the mixer body is provided, and such means are illustrated in connection with the form of the invention shown in Figs. 1 to 9, inclusive. It is highly desirable that both the temperature of the dough itself, or the contents of the mixer, and the mixer wall, be known at the same time, and preferably, means is provided for indicating both temperatures simultaneously. In Fig. 1 indicating means 46 is provided for indicating the temperature of the dough in the mixer, and indicating means 47 is provided for indicating the temperature of the refrigerated wall of the mixer. The indicating means 46 is shown in Fig. 5 as comprising a bulb, or hollow heat conducting body 48, which may contain a suitable heat responsive material 49, such as one expanding and contracting in accordance with variations in temperature, such as mercury, for example, which is provided with any well known means for actuating a pointer operating on a suitable scale on the indicating instrument 46, in accordance with said variations in temperature. It will be noted that the member 48 extends within the wall portion 18 and is insulated, as at 50, from the conduit portions 25 of the cooling, or refrigerating, coil.

The indicating instrument 47 is provided with a similar hollow body portion, or bulb member, 51, which is engaged in heat conducting relation with the sheet metal member 20 at one end thereof, and is insulated by means of the insulating means 50 from the adjacent conduit portions 25 of the refrigerating unit, and which contains a heat responsive fluid, or liquid, 52, similar to the fluid 49, operating a pointer cooperating with a scale on the instrument 47 in a similar manner to that previously described. Thus the indicating instrument 46 will indicate the temperature of the dough in the mixer, or of the contents of the mixer, and the indicating instrument 47 will indicate the temperature of the refrigerated mixer wall. The type of temperature indicating means shown is merely illustrative, any suitable temperature indicating means arranged in a similar manner to simultaneously indicate dough temperature and mixer wall temperature being contemplated.

Preferably, thermostatic controlling elements 53 and 54 are provided for controlling the cooling of my improved mixer. Said thermostatic elements 53 and 54 are made in the same way, and may be made in any desired manner, having a body portion 55 that is insulated by means of insulating means 56 from the adjacent conduits of the refrigerating element, and which is in heat conducting engagement with the sheet metal member 20, as shown in Fig. 7, said body portion containing and being in heat conducting relation to a thermostatic element that completes a circuit whenever a predetermined maximum temperature of the wall 20 is reached, said thermostatic element being adjustable, as by means of a knob 57, to any desired temperature setting at which the circuit will be closed, within the limits necessary for the satisfactory operation of the device, an indicating element 58 being provided, movable with the knob 57 cooperating with a scale 59 to indicate the setting of the thermostatic element to a temperature such as indicated by said scale. The thermostatic controlling elements 53 and 54 shown are merely illustrative, any temperature responsive switching means adjustable to a temperature indicated on a dial forming part of the means, which will close a circuit when a predetermined temperature is reached and will maintain said circuit closed for any temperature above said indicated temperature, being suitable for the purposes of my invention, as long as the same are in such heat transfer relation to the refrigerated wall of the mixer as to be responsive to the temperature thereof.

The apparatus is further, preferably, provided with a time switch 60, which may be of any desired type that will move a contact from one position to another after a predetermined time interval. Referring to the circuit diagram shown in Fig. 14, line wires 61 and 62 are shown, and a conductor 63 extends from the line wire 61 to the motor 32. From said motor 32 a conductor 64 extends to the electro-magnetic valve element 40, which, upon being energized, opens the valve to permit flow of liquid through the conduit 37. From said valve a conductor 65 extends to the branch conductors 66 and 67. The conductor 66 extends to the thermostatic switching element 53 and the conductor 67 to the switching element 54, the element 53 completing the circuit between the contacts 68 and 69 when a temperature to which the indicator of said instrument is set, is reached, and the switching element 54 being provided with similar contacts 70 and 71, the contact 71 engaging the contact 70 when the temperature to which the switching element 54 is set, is reached. The time switch 60 is shown diagrammatically as being provided with a conducting element 72, to which the conductor 73 from the contact 69 extends, and a contact 74, to which the conductor 75 from the contact 71 extends.

The time switch 60 has a movable contact element 76, which is movable from a position in engagement with a contact 72, to one in engagement with the contact 74, and the operation of the device is such that the contact 76 is normally in engagement with the contact 72 and will engage the contact 74 only after the time switch is set in operation, and at the expiration of a time interval to which the time switch is set. Accordingly, the thermostatic element 53 can be set to maintain the wall portions 18 and 19 at one temperature, let us say 33 degrees, and the thermostatic element 54 can be set at a temperature different than that, so as to maintain the wall portions 18 and 19 of the dough mixer body at a different temperature, let us say 40 degrees, for example. The time switch can be set so that it starts its operation at the beginning of the mixing operation and moves to a position that the contact 76 contacts the contact element 74 after a predetermined time interval subsequent to the starting of the mixing operation, let us say, for example, ten minutes, whereupon the thermostatic element 53 ceases to control the temperature of the dough mixer wall portions previously referred to, and the thermostatic element 54 commences to control said temperature of said wall portions. Thus means is provided for maintaining the temperature of the mixer wall at one temperature for a predetermined time interval during a mixing operation, and at a different temperature for the remainder of the mixing operation. A suitable switch 77 may be provided for opening and closing the operating circuit for the motor 32 manually, as shown in Fig. 14. Also a suitable manually operated switch 77' may be provided for controlling the operation of the motor 16.

Instead of providing the operating circuit shown in Fig. 14, that shown in Fig. 15 may be provided, or, if the apparatus is provided with two manually adjustable thermostatic elements 53 and 54, the time switch 60 could merely be maintained in an inoperative condition, if it is not necessary to operate under two different wall temperatures. However, if it is found for certain uses of the device that only one constant temperature for the wall is necessary, which temperature can be varied as desired, by the manually adjustable thermostatic means, a simplified arrangement shown in Fig. 15 can be provided, in which the conductor 63 again leads to the motor 32 and the conductor 64 to the electromagnetic valve element 40 and the conductor 65 leads directly to the contact 68, with which the thermostatically controlled contact 69 cooperates in the same manner as previously described, being the movable contact means of the thermostatic controlling element 53, and the manually controlled switching element 77 is provided, which leads to the line conductor 62.

It will be obvious that the operator of the mixer provided with my improved temperature controlling means and temperature indicating means can readily determine at what setting to place the thermostatic indicating elements 53 and 54 and the time switch 60, or merely a single thermostatic controlling element 53 to get the desired temperature readings of the indicating instruments 46 and 47, the dough temperature being, of course the most important temperature, which can be determined from the instrument 46, but the wall temperature being also important to the operator of the device so that he can determine by experience for what wall temperature to set the controlling elements 53 and 54 to get the desired temperature of the dough as indicated by the indicating instrument 46 at all stages of the mixing operation.

The valve 39 is provided for the purpose of preventing undue gas pressure on the pump 31, which might blow out a gasket. By manually closing the valve 39 when the mixer is shut down for the day, the refrigerating fluid in the expansion coil made up of the conduit portions 25, 26 and 29, will pass into the suction pipe 30 and through the pump 31 upon operation of said pump by the motor 32. By setting the thermostatic controlling elements 53 and 54 at a very high temperature, the motor 32 will very seldom function after the operation of the machine has ceased, but whenever it does, the refrigerant in the form of a gas will be pumped out of the expansion coil into the condenser and be stored in the receiver 36. This will continue until a state of equilibrium in the system is reached. In order to accomplish this operation of the device, the switch 77 is left closed while the device is not in operation. If the switch 77 were opened and the valve 39 were not provided, then the expansion of the refrigerant in the expansion coil as the wall rises in temperature during a long period of inoperativeness of the mixer would cause pressure to be built up that would enter the pump 31 and build up an excessive pressure therein, which might damage the pump by blowing out a gasket, or do some similar damage. By the provision of the valve 39 this is entirely avoided, as the device is thrown out of operation by withdrawal of refrigerant from the evaporator without the return of refrigerant thereto through the expansion valve, instead of by merely stopping the operation of the pumping means.

Instead of operating the device in the manner above described when no dough is being mixed, the bowl of the mixer can be utilized for cooling water for use in subsequent dough mixing operations. Means is, of course, provided for introducing water into the bowl from above in all dough mixers and this means is diagrammatically shown in Fig. 1, a water supply pipe 78 being provided having a valve 79 controlling the supply of water through the discharge end 80 of said pipe into the dough mixer. Tap water can be introduced through the pipe into the dough mixer. A liquid drain can be provided in the bottom of the bowl, such as a drain pipe 81 controlled by a valve 82. To utilize the dough mixer bowl for cooling and storing cold water for use in dough mixing operations when the dough mixer is not in use for such dough mixing operations, the mixer can be left in an upright position, as illustrated in the drawings, and filled with water through the pipe 78. The thermostatic control 53 can then be set at a desired temperature when only one manual control is used, and also where the controlling means shown in Fig. 1 is used, the time switch 60 not being set in operation, the temperature setting of the thermostatic element 53 being, preferably, approximately 33 degrees or as near to the freezing point of water, without actually reaching the freezing point, as it is possible to set the apparatus. The refrigerating apparatus is left in full operation during the time that no dough mixing is done while the mixer is so filled with water, and a large quanity of cold water is thus produced which can be drawn off through the drain pipe 81 into any suitable container by operating the valve 82 when the same has reached the desired temperature, or when needed, after having been maintained at such desired temperature, the refrigerating apparatus operating to maintain such temperature even overnight, if desired. It is, of course, obvious that if desired, a suitable insulated storage receptacle can be provided for the refrigerated water after having been cooled in the dough mixer bowl, from which it can be pumped or otherwise conducted to a mixer, or mixers, in which the same is utilized. Thus with my refrigerating means for dough mixer bowls, it is not necessary to have additional refrigerating apparatus for water alone.

Preferably, in all forms of my invention, the entire cooling coil, made up of the conduit portions 25, 26 and 29, is insulated from the atmosphere by means of a suitable thickness of sheet insulating material 83, which may be sheet cork, for example, and which is covered by a protective sheet metal covering 84, the sheet metal covering being secured at the edges thereof in any suitable manner, as by welding, for example, to the sheet metal member carrying the channels forming the conduits, or to the body of the mixer itself, in the form of the invention shown in Figs. 10 and 11.

What I claim is:

1. In a dough mixer, a mixing chamber having a wall, agitating means in said chamber periodically engaging dough being mixed in said chamber with said wall, and refrigerating means for said wall, comprising a refrigerant expansion chamber in direct heat transfer relation to said wall, said expansion chamber comprising a plurality of adjacent parallel channel members of substantially U-shaped section, connected alternately at opposite ends thereof in series to form a continuous circuitous conduit along said wall.

2. In a dough mixer, a mixing chamber tiltably mounted to dump the contents thereof, having a wall, and refrigerating means for said wall, comprising a refrigerant expansion chamber in direct heat transfer relation to said wall, means for introducing water into said mixing chamber and means for draining water therefrom.

3. In a dough mixer, a mixing chamber having a wall and refrigerating means for said wall, comprising a refrigerant expansion chamber in direct heat transfer relation to said wall, said expansion chamber comprising a flexible metallic wall having a plurality of spaced channel members secured thereto to form a circuitous conduit, said flexible metallic wall being secured in heat transfer relation to said mixer wall.

4. In a dough mixer, a mixing chamber having a wall and refrigerating means for said wall, comprising a refrigerant expansion chamber in direct heat transfer relation to said wall, said expansion chamber comprising a plurality of spaced channel members connected in series to form a continuous circuitous conduit and having the flanges thereof secured in fluid-tight relation to said mixer wall.

5. In a dough mixer, a mixing chamber having a wall and refrigerating means for said wall, comprising a refrigerant expansion chamber in direct heat transfer relation to said wall, said expansion chamber comprising a flexible metallic wall having conduit forming means secured thereto to form a continuous circuitous refrigerant passage in heat transfer relation to said mixer wall.

6. In a dough mixer, a mixing chamber having a wall, refrigerating means for said wall, comprising a refrigerant expansion chamber in direct heat transfer relation to said wall, a plurality of means for controlling the supply of refrigerant to said expansion chamber responsive to the temperature of said wall, and time-responsive means for successively selecting the temperature responsive means controlling said supply of refrigerant.

7. In a dough mixer, a mixing chamber having a wall, refrigerating means for said wall, and controlling means for said refrigerating means to maintain said wall at a predetermined temperature for a predetermined interval after starting the operation of said mixer and at another predetermined temperature after said interval.

8. In the method of mixing a mass of material having a normal tendency to rise in temperature during the mixing action, cooling the major portion of the walls of the mixing chamber to a temperature slightly above the freezing point of water, introducing the ingredients of said mass of material into said chamber, and mixing the contents of said chamber while cooling said portion of said walls to said temperature.

9. In the method of mixing a mass of material having a normal tendency to rise in temperature during the mixing action, cooling the major portion of the walls of the mixing chamber to a temperature slightly above the freezing point of water, introducing the ingredients of said mass of material into said chamber, and mixing the contents of said chamber while cooling said portion of said walls to said temperature for a predetermined interval of time and then to a different temperature for a predetermined interval of time.

10. In the method of mixing a mass of material having a normal tendency to rise in temperature during the mixing action, cooling the major portion of the walls of the mixing chamber to a temperature slightly above the freezing point of water, introducing the ingredients of said mass of material into said chamber, and mixing the contents of said chamber while cooling said portion of said walls to said temperature for a predetermined interval of time and then to a different temperature above the freezing point of water for a predetermined interval of time.

11. In a dough mixer, a mixing chamber having a wall, agitating means in said chamber periodically engaging dough being mixed in said chamber with said wall, and means for cooling said wall comprising means for conducting cooling medium through restricted passages in a circuitous path in heat transfer relation to said wall, said means comprising channel members of substantially U-shaped section connected together in series and means for mounting the same on said wall with the longitudinal edges thereof secured in fluid-tight relation to said wall to form fluid-tight conduits of said channel members and the portions of said chamber wall between said edges.

12. In a dough mixer, a mixing chamber having a wall and means for cooling said wall comprising means for conducting cooling medium through restricted passages in a circuitous path in heat transfer relation to said wall, said means comprising channel members connected together and means for mounting the same on said wall to form fluid-tight conduits, comprising a flexible sheet metal member secured to said wall face to face and having the flanges of said channels secured in fluid-tight relation thereto.

13. In a dough mixer, a mixing chamber having a wall, means in said chamber for repeatedly contacting a mass of dough therein with said wall, and refrigerating means for said wall comprising a plurality of conduits interconnected to form a continuous circuitous passage in heat transfer relation to said wall, means for indicating the temperature of said wall comprising temperature responsive means engaging said wall and means for indicating the temperature of the contents of said mixing chamber, comprising temperature responsive means extending through said wall.

14. In a dough mixer, a mixing chamber having a wall, means in said chamber for repeatedly contacting a mass of dough therein with said wall, and refrigerating means for said wall, comprising a refrigerant expansion chamber in direct heat transfer relation to said wall, means for indicating the temperature of said wall and means for indicating the temperature of the contents of said mixing chamber.

15. In a dough mixer, a mixing chamber having a wall and refrigerating means for said wall, comprising a refrigerant expansion chamber in direct heat transfer relation to said wall, said expansion chamber comprising a flexible metallic wall having a plurality of spaced channel members secured thereto to form a circuitous conduit, said flexible metallic wall being secured to said mixer wall, and heat conducting means between said flexible wall and said mixer wall.

16. In a dough mixer, a mixing chamber having a wall and refrigerating means for said wall, comprising a refrigerant expansion chamber in direct heat transfer relation to said wall, said expansion chamber comprising a plurality of adjacent parallel channel members connected in series to form a continuous circuitous conduit and having the open sides thereof facing said wall and the longitudinal edges thereof secured in fluid-tight relation to said mixer wall.

17. In the method of mixing a mass of material having a normal tendency to rise in temperature during the mixing action, cooling a predetermined portion of the walls of the mixing chamber in engagement with said material to a temperature slightly above the freezing point of water, introducing the ingredients of said mass of material into said chamber, and mixing the contents of said chamber while cooling said portion of said walls to said temperature.

18. In the method of mixing a mass of material having a normal tendency to rise in temperature during the mixing action, cooling a predetermined portion of the walls of the mixing chamber in engagement with said material to a temperature slightly above the freezing point of water, introducing the ingredients of said mass of material into said chamber, and mixing the contents of said chamber while cooling said portion of said walls to said temperature for a predetermined interval of time and then to a different temperature for a predetermined interval of time.

19. In a dough mixer, a mixing chamber having a wall, means in said chamber for repeatedly contacting a mass of dough therein with said wall, and refrigerating means for said wall comprising a plurality of conduits interconnected to form a continuous circuitous passage in heat transfer relation to said wall, and means for indicating the temperature of said wall, comprising temperature responsive means engaging said wall.

MERLIN A. STICELBER.